UNITED STATES PATENT OFFICE.

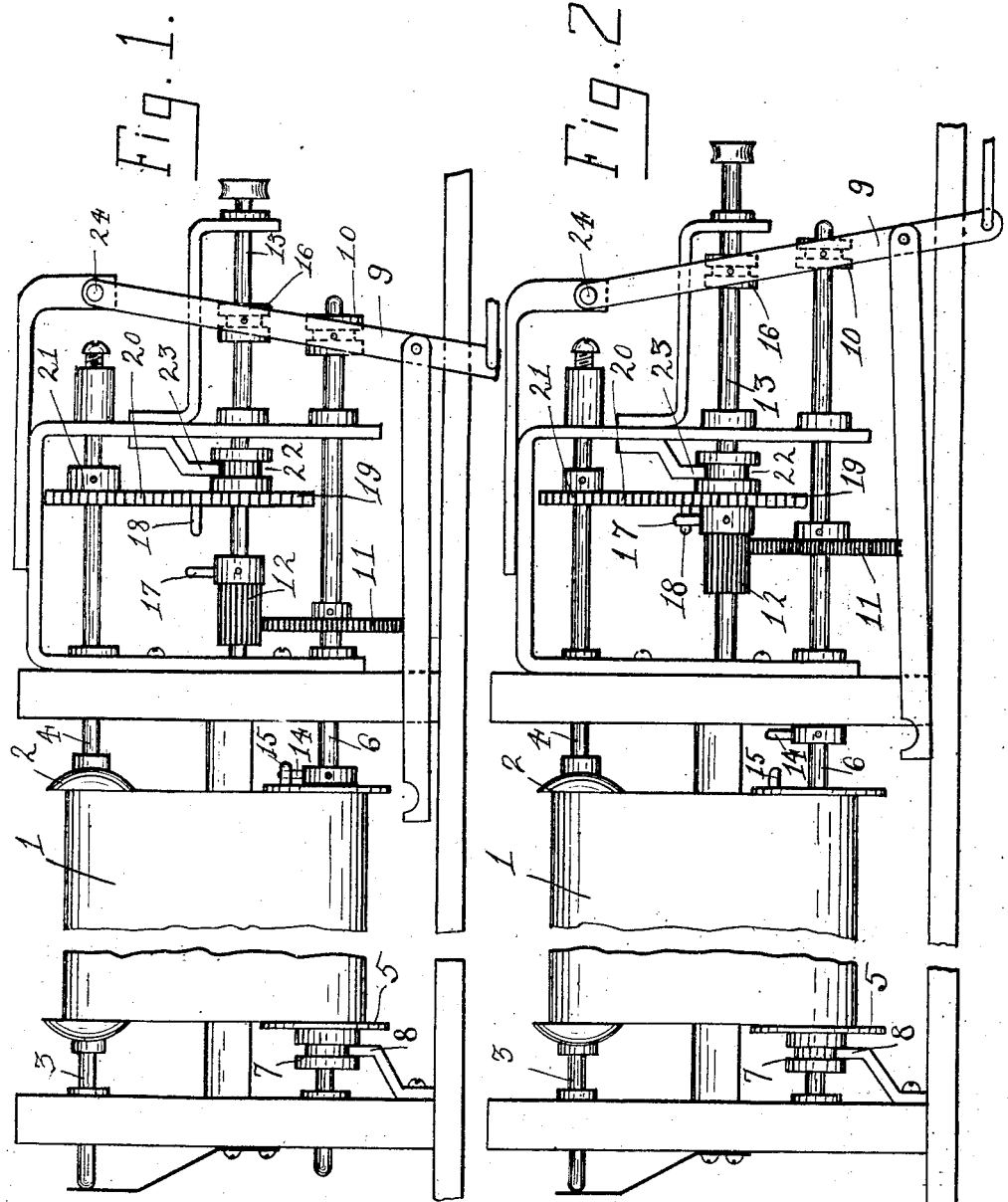

ROBERT A. GALLY, OF CINCINNATI, OHIO, ASSIGNOR TO THE BALDWIN COMPANY, OF CINCINNATI, OHIO.

MUSIC-ROLL GEARING.

1,255,305.　　　　Specification of Letters Patent.　　Patented Feb. 5, 1918.

Application filed September 17, 1917. Serial No. 191,805.

*To all whom it may concern:*

Be it known that I, ROBERT A. GALLY, a citizen of the United States, and residing at Cincinnati, in the county of Hamilton and State of Ohio, have invented certain new and useful Improvements in Music-Roll Gearing, of which the following is a specification.

In the prior art, Arno #596,768, January 4, 1898, has a constant mesh drive between his drive pinion and his take-up spool gear, but with two drawbacks, the pinion is driven at high speed from the gear during the rewind operation, and the pinion is loose on its shaft. In applicant's separate application #186,981, filed August 18, 1917, is shown an improved device wherein the pinion always runs at low speed into the large gear, and is solid on its shaft, but the large gear is loose on its shaft. In the present improvement the pinion always runs at low speed and into the large gear, and both the pinion and the gear are tight on their shafts, securing certainty of quietness after long wear, although requiring a few more parts than the other said application #186,981.

In the drawings Figure 1 shows the improved gearing set for forward winding of a music sheet, and Fig. 2 is the same gearing set for rewinding the sheet.

Any music sheet as 1 to be used with a player gearing is mounted on a roll 2 which is engaged and carried by two clutch spindles 3, 4, and a take-up spool 5 is loosely mounted on a spool shaft 6, the spool 5 being kept to the proper position of its length, that is, the width of the sheet, by means of a grooved collar 7 fixed with the spool 5 but likewise loose on the shaft 6, and in the groove of this collar 7 is engaged a guide bracket 8 fixed to any permanent part of the apparatus.

The revolution of the spool 5 for winding the music sheet 1 from its roll 2 is accomplished by the revolution of the spool shaft 6 whenever the said shaft 6 is shifted to the left as in Fig. 1, by means of the shifter lever 9 which is engaged with the grooved collar 10 on the said shaft 6 the shaft 6 being revolved at such a time by means of the gear 11 fixed with the said shaft and driven from the pinion 12 fixed on the drive shaft 13, which shaft 13 is always revolubly driven whenever the apparatus is in use. At the same leftward position of the shaft 6, a clutch 14 thereon is engaged with a clutch 15 on the take-up spool 5, whereby the spool 5 is revolved with the shaft 6. At this same condition of shift to the left for winding operation, the shift lever 9 has moved the grooved collar 16 fixed on drive shaft 13, and thus moved the said drive shaft 13 leftward, thus disengaging the clutch 17 which is fixed with shaft 13, from the clutch 18 of sprocket wheel 19, which sprocket wheel 19 is loose on drive shaft 13, the sprocket wheel 19 being then free to be revolved by the chain 20 from the revolution of the small sprocket 21 fixed on spindle 4 which is then being revolved by the drawing off of the sheet 1 as it is wound off upon its roll 2 by the revolution of the take-up spool 5. The hub of the sprocket wheel 19 has a groove 22 engaging guide 23 to hold said sprocket wheel 19 in one position.

When the shift lever 9 is moved to the right as in Fig. 2, the spool shaft 6 is also shifted to the right and its clutch 14 is then disengaged from the clutch 15 on the take-up spool 5, thus leaving the take-up spool 5 free to be revolved reversely by the music sheet 1 as the said sheet 1 is rewound on to its roll 2 by means of the spindle 4 being revolved by its sprocket 21 as driven by the chain 20 propelled by the large sprocket 19, the said large sprocket 19 being then engaged and driven by its clutch 18 now clutched by the clutch 17 of the drive shaft 13, the drive shaft 13 and its clutch 17 having been moved to the right by the shift lever 9 as it was shifted to this rightward rewind position.

Instead of the sprocket wheel 19 or equivalent device being mounted directly on the shaft 13, it may be mounted on an extra shaft or bearing in axial alinement with the shaft 13, and any wheel or clutch may be revolubly fixed with such removed sprocket on its special shaft, so that a clutch means is combined with the said parts in such manner as will enable the engaging and disengaging of the shaft 13 and the sprocket wheel 19 or its equivalent. An example of a clutch wheel and sprocket wheel at a distance from each other on the one shaft is shown in applicant's prior Patent #1,106,297, Aug. 4, 1914.

By the leftward or rightward movement of the shift lever 9 and the two shafts 6 and 13, the shifting movement of the spool shaft 6 is greater than that of the drive shaft 13, this lever 9 being pivoted at 24, farther from shaft 6 than from shaft 13, consequently the large gear 11 takes a different position lengthwise of the pinion 12 at the winding and rewinding positions of operation, thereby more than doubling the wear of the pinion. During the rewinding operation as in Fig. 2, the pinion 12 still continues to drive the gear wheel 11 at slow speed, but little faster than during forward winding, and as there is no load against the revolution of the shaft 6, the take-up spool 5 then being unclutched from the shaft 6, there is no noise, and practically no wear on the pinion and gear at such time of rewinding.

The two degrees of shift motion of the two shafts and their gears is set forth herein because it is one of the desirable details obtainable with the present structure, but as it is also obtained with the structure set forth in applicant's said prior application #186,981, it is claimed therein instead of in this application but, What I herein claim as my invention, is:

1. A take-up spool; a slidable and revoluble shaft on which said spool is loosely mounted; guide means adapted to retain the said spool in correct position as to its length; clutch means adapted to clutch the said spool into revoluble engagement with said shaft at one longitudinal position of the said shaft, and to unclutch the said spool from revoluble engagement with the said shaft at another longitudinal position of the said shaft; a gear fixed with the said spool shaft; a pinion constantly engaged with the said gear and fixed with a slidable and revoluble drive shaft parallel to the said spool shaft; and shifter means engaging the said spool shaft and adapted to slide the said shaft to its clutched and unclutched positions with the said take-up spool.

2. A take-up spool; a slidable and revoluble shaft on which said spool is loosely mounted; guide means adapted to retain the said spool in correct position as to its length; clutch means adapted to clutch the said spool into revoluble engagement with said shaft at one longitudinal position of the said shaft, and to unclutch the said spool from revoluble engagement with the said shaft at another longitudinal position of the said shaft; a gear fixed with the said spool shaft; a pinion constantly engaged with the said gear and fixed with a slidable and revoluble drive shaft parallel to the said spool shaft; and shifter means engaging both said shafts and adapted to shift both the said shafts to and fro.

3. A take-up spool; a slidable and revoluble shaft on which said spool is loosely mounted; guide means adapted to retain the said spool in correct position as to its length; clutch means adapted to clutch the said spool into revoluble engagement with said shaft at one longitudinal position of the said shaft, and to unclutch the said spool from revoluble engagement with the said shaft at another longitudinal position of the said shaft; a gear fixed with the said spool shaft; a pinion constantly engaged with the said gear and fixed with a slidable and revoluble drive shaft parallel to the said spool shaft and shifter means engaging both said shafts; and adapted to move both the said shafts to and fro in one direction at the same time.

4. A take-up spool; a slidable and revoluble shaft on which said spool is loosely mounted; guide means adapted to retain the said spool in correct position as to its length; clutch means adapted to clutch the said spool into revoluble engagement with said shaft at one longitudinal position of the said shaft, and to unclutch the said spool from revoluble engagement with the said shaft at another longitudinal position of the said shaft; a gear fixed with the said spool shaft; a pinion constantly engaged with the said gear and fixed with a slidable and revoluble drive shaft parallel to the said spool shaft; and shifter means engaging both said shafts and adapted to shift both the said shafts to and fro; a sprocket wheel loose on the said drive shaft; guide means engaged with the said sprocket wheel and adapted to maintain the said sprocket wheel to one position in the direction of the axis of the said sprocket wheel; clutch means adapted to engage the said sprocket wheel to the said drive shaft when the spool shaft is disengaged from the said spool and to disengage the said sprocket wheel from the said drive shaft when the said spool shaft is engaged with the said spool; a spindle adapted to engage and revolve a music roll; and drive means from the said sprocket wheel to the said spindle.

5. A revoluble and slidable shaft; a take-up spool loosely mounted on the said shaft, and a guide means adapted to retain the spool in a certain position in the direction of its axis, and a clutch fixed to the said spool; a clutch fixed with the said shaft; and a gear wheel fixed with the said shaft; a revoluble and slidable drive shaft parallel to the said spool shaft and a pinion fixed with the said drive shaft and always meshing with the said gear; a wheel loosely mounted on the said drive shaft and a guide means adapted to retain the said wheel in a certain position in direction of its axis, and a clutch fixed to the said drive shaft; shifter means engaging both the said shafts and adapted to slidably shift the said shafts lengthwise of their axes; the clutches of the take-up spool and its shaft adapted to be engaged together when the clutches of the said drive shaft and its wheel are disengaged, and vice versa, the two said conditions of engagement and disengagement corresponding to two different positions of the said two shafts in the direction of their axes as set by the said shifter.

6. A revoluble and slidable shaft and means for constantly revolving the said shaft in one direction; a pinion fixed with the said shaft; a second revoluble and slidable shaft parallel to the said pinion shaft and a gear wheel fixed to the said second shaft and constantly meshed with the said pinion; a take-up spool; a music roll spindle and means adapted to drive the said spindle in reverse direction to the take-up revolution of the take-up spool; clutch means adapted to revolubly engage together the said reverse drive and the said first named shaft having the pinion thereon; and clutch means adapted to revolubly engage together the said take-up spool and the said second named shaft having the gear wheel thereon; and shifter means engaging the two said shafts and adapted to alternately cause the engagement of one or the other of the said clutch means and the disengagement of the other clutch means at that same time.

ROBT. A. GALLY.

Witnesses:
PAUL J. HENGGE,
NORMA KEISER.

Copies of this patent may be obtained for five cents each, by addressing the "Commissioner of Patents, Washington, D. C."